US007313819B2

(12) United States Patent
Burnett et al.

(10) Patent No.: US 7,313,819 B2
(45) Date of Patent: Dec. 25, 2007

(54) AUTOMATED ESTABLISHMENT OF ADDRESSABILITY OF A NETWORK DEVICE FOR A TARGET NETWORK ENVIRONMENT

(75) Inventors: Keith L. Burnett, Arlington, MA (US); Dayman Pang, North York (CA); Victor C. Robison, Guelph (CA)

(73) Assignee: Intel Corporation, Santa Clara, CA (US)

( * ) Notice: Subject to any disclaimer, the term of this patent is extended or adjusted under 35 U.S.C. 154(b) by 1125 days.

(21) Appl. No.: 09/957,879

(22) Filed: Sep. 20, 2001

(65) Prior Publication Data

US 2003/0018889 A1 Jan. 23, 2003

Related U.S. Application Data

(60) Provisional application No. 60/307,099, filed on Jul. 20, 2001.

(51) Int. Cl.
*G06F 17/00* (2006.01)
(52) U.S. Cl. ............ 726/15; 710/8; 710/9; 710/10
(58) Field of Classification Search ........... 713/1–2, 713/100; 710/8–10; 726/15
See application file for complete search history.

(56) References Cited

U.S. PATENT DOCUMENTS

| | | | |
|---|---|---|---|
| 5,898,830 A * | 4/1999 | Wesinger et al. | 726/15 |
| 5,911,084 A * | 6/1999 | Jones et al. | 710/62 |
| 5,983,273 A | 11/1999 | White et al. | |
| 5,988,512 A * | 11/1999 | Eisele | 235/492 |
| 6,012,088 A | 1/2000 | Li et al. | |
| 6,438,594 B1 * | 8/2002 | Bowman-Amuah | 709/225 |

(Continued)

FOREIGN PATENT DOCUMENTS

EP 1 059 791 A 12/2000

(Continued)

OTHER PUBLICATIONS

Carter (Alan R. Carter, "Windows NT 4.0 MCSE Study Guide", 1997, ISBN: 0764530879).*

(Continued)

*Primary Examiner*—Kambiz Zand
*Assistant Examiner*—Peter Poltorak
(74) *Attorney, Agent, or Firm*—Blakely, Sokoloff, Taylor & Zafman LLP

(57) ABSTRACT

Apparatus and methods are provided for remote, automated, and secure network device provisioning over a pre-existing communications network. According to one embodiment, automated establishment of addressability of a network device is supported for a target network environment. A boot time process of a network device in a factory default configuration detects the presence of a storage device containing therein addressability data that allows the network device to communicate and be addressable within the target network environment. After detecting the presence of the storage device, the network device receives the addressability data from the storage device by using a communication protocol associated with the storage device. Finally, addressability of the network device is established to enable it to communicate with and be addressed by other nodes in the target network environment by configuring one or more address parameters of the network device based upon the addressability data.

60 Claims, 8 Drawing Sheets

U.S. PATENT DOCUMENTS

| | | | |
|---|---|---|---|
| 6,665,714 B1 * | 12/2003 | Blumenau et al. | 709/222 |
| 6,822,971 B1 * | 11/2004 | Mikkonen | 370/475 |
| 2002/0026503 A1 * | 2/2002 | Bendinelli et al. | 709/220 |
| 2002/0087877 A1 * | 7/2002 | Grawrock | 713/200 |

FOREIGN PATENT DOCUMENTS

| | | |
|---|---|---|
| EP | 1 179 915 A | 2/2002 |
| WO | WO 99 21336 A | 4/1999 |
| WO | WO 00 79738 A | 12/2000 |
| WO | WO 0079738 * | 12/2000 |
| WO | WO 02 03616 A | 1/2002 |

OTHER PUBLICATIONS

Pfleeger (Charles P. Pfleeger, "Security in computing", 2nd edition, 1996, ISBN: 0133374866), p. 412-413.*

Hill (Tim Hill, "Windows NT shell scripting", 1998, ISBN: 1578700477), introduction.*

* cited by examiner

AUTOMATED ESTABLISHMENT OF ADDRESSABILITY OF A NETWORK DEVICE FOR A TARGET NETWORK ENVIRONMENT

This application claims the benefit of U.S. Provisional Application No. 60/307,099, filed Jul. 20, 2001.

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever.

BACKGROUND OF THE INVENTION

1. Field of the Invention

The invention relates generally to the field of networking devices. More particularly, the invention relates to a method and apparatus for secure and automated establishment of addressability of a network device, such as a router, a switch, a firewall, a virtual private network gateway, and the like, for a target network environment and securely and automatically provisioning the network device with configuration data to bring it into a fully defined, functional state.

2. Description of the Related Art

Network computing and communication devices, such as routers, switches, firewalls and virtual private network gateways, are extremely administration intensive. These network devices usually support many configurable parameters that must all be set correctly, based on how the network device is to function in the context of surrounding equipment. To set up this kind of equipment properly, an organization typically depends on a qualified administrator (either someone on staff or from a third party) with a competent understanding of networking principles and protocols. Furthermore, these skilled administrators typically must have some physical access to the network device to make it operational. Therefore, they must typically either travel to each site in the network or obtain access to the network devices prior to installation at their intended location.

While several management protocol, such as Simple Network Management Protocol (SNMP), exist to allow network devices already having a valid Internet Protocol (IP) configuration to be configured over a pre-existing network, currently there is no existing mechanism to automatically and securely take a network device from a factory default state to an initial operating state in which the network device can communicate and be addressable within the intended network environment.

BRIEF DESCRIPTION OF THE SEVERAL VIEWS OF THE DRAWINGS

The present invention is illustrated by way of example, and not by way of limitation, in the figures of the accompanying drawings and in which like reference numerals refer to similar elements and in which.

DETAILED DESCRIPTION OF THE INVENTION

Figure 1:
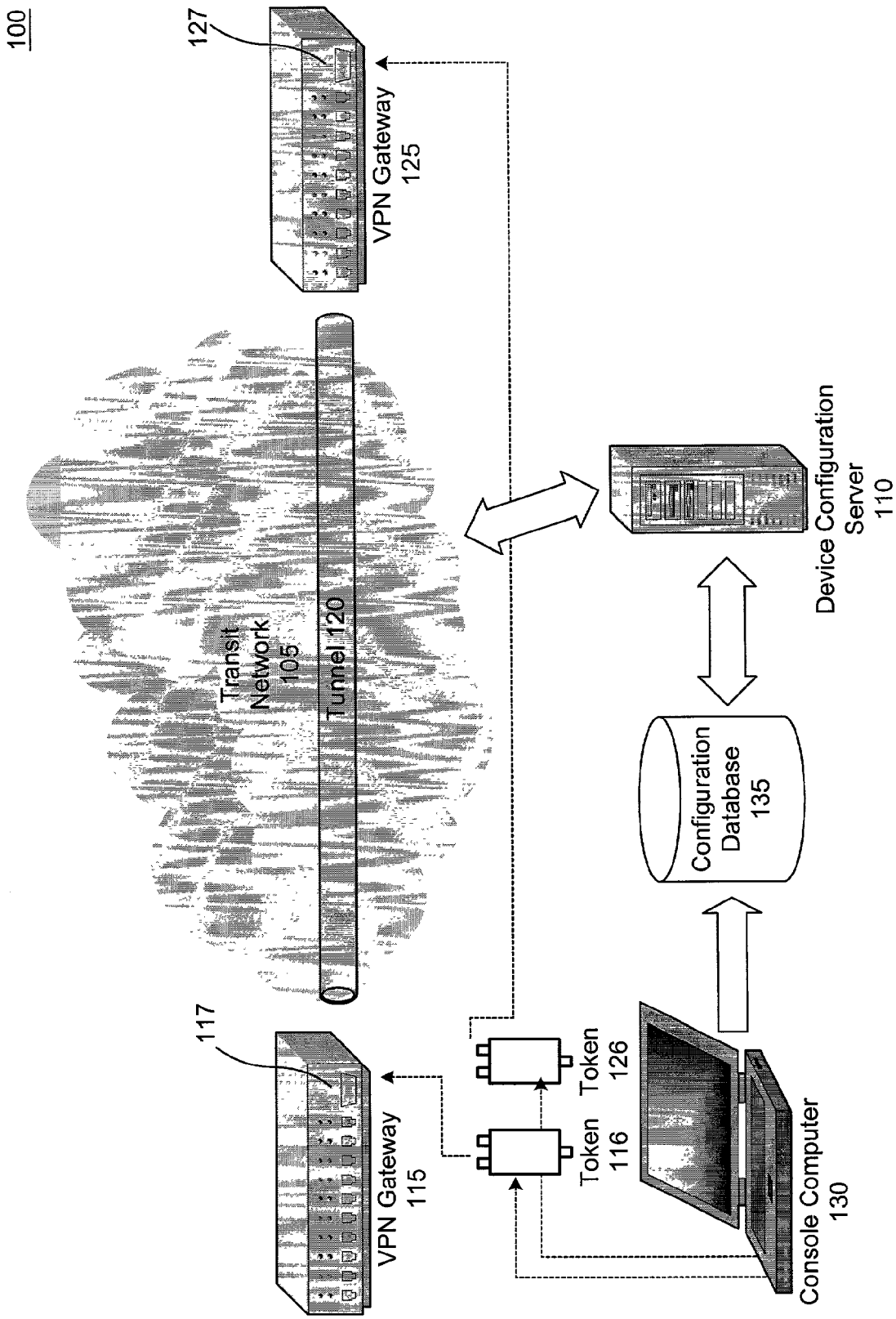
FIG. 1 illustrates an exemplary virtual private network (VPN) provisioning system according to one embodiment of the present invention.

Apparatus and methods are described for remote, automated, and secure network device provisioning over a pre-existing communications network. Broadly stated, embodiments of the present invention seek to provide an administratively straightforward and uncomplicated mechanism for establishing addressability and provisioning network devices, such as routers, switches, firewalls, and virtual private network gateways.

Automatic enablement of addressability and automatic provisioning are thought to provide a significant selling feature, especially in the VPN industry, where the technology is still poorly enough understood by customers that service management must remain in the hands of the service provider in many cases. Until now, a key part of this service management has been the obligatory on-site visits for setting up customer premise equipment. The ability to avoid such visits is anticipated to translate into substantial cost savings to VPN service providers and/or equipment vendors.

Additional advantages of embodiments of the present invention, include original equipment manufacturers (OEMs) and service-provider customers being able to increase the productivity of their own skilled networking personnel and end users of the improved networking devices attaining increased ease of use and efficiency since they need neither technical personnel nor individual site visits.

In the following description, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form.

The present invention includes various steps, which will be described below. The steps of the present invention may be performed by hardware components or may be embodied in machine-executable instructions, which may be used to cause a general-purpose or special-purpose processor programmed with the instructions to perform the steps. Alternatively, the steps may be performed by a combination of hardware and software.

The present invention may be provided as a computer program product that may include a machine-readable medium having stored thereon instructions which may be used to program a computer (or other electronic devices) to perform a process according to the present invention. The machine-readable medium may include, but is not limited to, floppy diskettes, optical disks, compact disc read-only memories (CD-ROMs), and magneto-optical disks, ROMs, random access memories (RAMs), erasable programmable read-only memories (EPROMs), electrically erasable programmable read-only memories (EEPROMs), magnetic or optical cards, flash memory, or other type of media/machine-readable medium suitable for storing electronic instructions. Moreover, the present invention may also be downloaded as a computer program product, wherein the program may be transferred from a remote computer to a requesting computer by way of data signals embodied in a carrier wave or other propagation medium via a communication link (e.g., a modem or network connection).

While, for convenience, embodiments of the present invention are described with reference to virtual private network (VPN) devices and in the context of an exemplary VPN network, the present invention is equally applicable to various other network devices, such as routers, switches, bridges, and firewalls, and various other network environments. Additionally, while the VPN Provision Manager described herein addresses site-site VPN services, remote access services for complementary devices, such as routers, are contemplated. Furthermore, through integration with premium IP services, mechanisms for quality of service (QoS), voice, and application distribution may be added.

Terminology

Before describing an exemplary network environment in which various embodiments of the present invention may be implemented, some terms that will be used throughout this application will briefly be defined.

As used herein a "network device" generally refers to an intermediate device that facilitates computer-to-computer communications over an interconnected set of local area networks (LANs). Exemplary network devices include gateways, routers, switches, bridges, and firewalls.

The term "firmware" generally refers to program instructions used to operate the network device and implement its features. Firmware may include program instructions implementing system components such as operating systems, device drivers, network protocol stacks, and management protocols. These program instructions may be stored in media such as flash memory modules, EPROMs, EEPROMs, and field-programmable gate arrays (FPGAs), or they may be transmitted to the device, fully or in part, using intermediate devices or communications protocols under the control of the smart hardware storage device, as defined below.

The term "factory default configuration" or "factory default state" generally refers to an "out-of-the-box" or uninitialized configuration or state in which a network device does contain firmware but contains no data to identify itself to the target network environment in which it will be functioning and contains no data identifying other network devices in the target network environment. For example, a network device in a factory default configuration cannot be addressed on the network as it has not yet been assigned a logical address, such as an Internet protocol (IP) address, within the address space employed by the network. Additionally, the network device cannot communicate on the network as it does not have information regarding logical addresses of its peers.

The term "initial operating configuration" or "initial operating state" generally refers to an initialized configuration or state but not necessarily a fully defined, functional state. For example, a network device in an initial operating configuration, e.g., having a valid IP configuration, can communicate and be addressable within a particular network environment, but may not yet know how it is to handle certain types of network traffic.

The term "addressability data" generally refers to data that can directly or indirectly take a network device from the factory default configuration to the initial operating configuration. According to the embodiments described herein, addressability data may include one or more of the following: (1) a unique logical address, such as an IP address, for the network device; (2) a local IP subnet mask for the network device; (3) a logical address associated with a default gateway for the network device; (4) a logical address of a remote device configuration server; (5) a logical name, such as a domain name address of a Domain Name System (DNS) entry or the like, that represents or can be mapped into a unique logical address for the network device; (6) a logical name that represents or can be mapped into a logical address associated with the default gateway; and (7) a logical name that represents or can be mapped into a logical address of the remote device configuration server.

The term "configuration data" generally refers to data that can take a network device from the initial operating configuration to a fully defined, functional state. For example, in the context of a first VPN device that will be establishing secure tunnels with one or more peer VPN devices, configuration data for the first VPN device might include the IP addresses of the peer VPN devices and details about the types of network traffic that is permitted to travel through the secure tunnels. In this example, the fully defined, functional state is achieved when the first VPN device has established the secure tunnels with the peer VPN devices and has appropriately configured itself so as to ensure that only permissible network traffic travels through each of the secure tunnels.

The term "security data" generally refers to a shared secret or data that may be utilized to generate a shared secret that is used by the network device to access configuration data from the remote device configuration server. According to one embodiment, the security data is used directly or indirectly to encrypt communications exchanged between the network device and the remote device configuration server. According to another embodiment, the security data comprises a unique identifier or password that is conveyed to the network device from the storage device. In other embodiments, which may include communications with intermediate devices, such communications between intermediate devices may themselves utilize additional secure protocols such as Internet Protocol Security (IPSec) and additional security mechanisms such as X.509 certificates.

As used herein, the phrase "establishing addressability" of a network device generally refers to a process of taking a network device from a factory default state (e.g., a state in which it is not operational within the target network environment) to an initial operating state (e.g., a state in which the network device can communicate with and be addressed by other network devices within the target network environment).

As used herein, "provisioning" a network device refers generally to providing configuration data or parameters associated with for one or more of the following stages of network device management: configuration, services, and applications. For example, as used herein provisioning may encompass one or both of the following: (1) configuring the network device with all customer-specific data needed to bring the network device into a fully defined, functional state; (2) enabling of premium IP services, such as Quality of Service (QoS) and voice.

As used herein a "virtual private network or VPN" generally refers to a set of nodes, such as network devices and computer systems, coupled to a transit network or internetwork, such as the Internet, that communicate among each other using encryption technology. In this manner, a wide area network (WAN) may be formed, in which the messages exchanged between the nodes are safe from being intercepted and understood by unauthorized users, without the expense of private lines, leased lines, and/or long-haul dedicated circuits.

As used herein, a "smart hardware storage device" generally refers to a user-serviceable, portable, removable storage device that may be externally communicatively coupled with the network device. As such, this definition excludes flash memory modules that are intended for internal use within a network device. However, the smart hardware storage device may participate in loading, selecting, or altering the data stored in such flash memory modules, such as firmware or bootstrap parameters, in order to configure the network device. Importantly, the smart hardware storage device need not be directly or physically coupled to the network device. For example, the smart hardware storage device may be coupled directly or indirectly through one or more intermediate devices to a provisioning port of the network device or communicate with the network device using a wireless data transmission protocol. Various types of hardware storage devices are contemplated such as electronic security devices, keys, keycards, locks, sentinels, dongles, hardware keys, wireless handheld devices, smart cards, magnetically encoded cards, or hardware tokens, including Universal Serial Bus (USB) hardware tokens and the like.

As used herein, a "transit network" may be an intermediate public or private network or internetwork. The Internet is an example of a public internetwork. A corporate or enterprise network is an example of a private network or internetwork.

Exemplary VPN Provisioning System

FIG. 1 illustrates an exemplary virtual private network (VPN) provisioning system 100 according to one embodiment of the present invention. In this example, the VPN provisioning system 100 includes two VPN gateways 115 and 125, a console computer 130, two tokens 116 and 126, a configuration database 135, and a device configuration server 110.

After the VPN gateways 115 and 125 are delivered to the appropriate customer network sites, the VPN gateways 115 and 125 are coupled to a transit network 105, such as the Internet, as part of the administratively straightforward and uncomplicated installation process. In this example, the VPN gateways 115 and 125 are provided with provisioning interfaces 117 and 127, respectively, such as asynchronous communications ports complying with American National Standards Institute (ANSI)/Telecommunications Industry Association (TIA)/Electronic Industries Alliance (EIA)-232-F-1997 (ANSI/TIA/EIA-232-F-1997), published October 1997 (herein after "EIA232") or other serial, parallel, or USB ports, to receive out-of-band data from external storage devices, such as tokens 116 and 126. According to one embodiment, the out-of-band data includes basic addressability data that enables the VPN gateways 115 and 125 to boot up in an initial operating state in which it can communicate and be addressable within its network environment. At this point, a manual or automated configuration process may be commenced to bring the VPN gateways 115 and 125 into a fully defined, functional state. For example, an automated configuration process may acquire appropriate parameters to establish a tunnel 120 between VPN gateways 115 and 125 thereby allowing VPN gateways 115 and 125 to exchange data securely over the transit network 105 via the tunnel 120.

The console computer 130 runs a configuration program (not shown) that allows a network technician to enter configuration data into the configuration database 135. The console computer 130 also includes an interface (not shown), such as an asynchronous EIA232-compliant communications port, that allows the configuration program to program storage devices, such as tokens 116 and 126, with data, such as addressability data and security data, as described further below.

According to one embodiment, tokens 116 and 126 are smart hardware devices that contain a relatively small amount of non-volatile, programmable memory, typically on the order of 100 bytes, that can be programmed and read by way of a communication protocol. As indicated by the dotted lines, the tokens 116 and 126 may interface with both the console computer 130 and the network device(s) to be provisioned, such as VPN gateway 115 and 125. For example, tokens 116 and 126 may be plugged into a port, such as an asynchronous EIA232-compliant communications port. In a typical scenario, the tokens 116 and 126 are programmed by the console computer 130 with addressability data for use by network devices, such as VPN gateway 115 and 125, in a predetermined target network environment. While for sake of simplicity embodiments of the present invention will be described with reference to the use of particular types of hardware tokens, in alternative embodiments, various other storage devices, such as wireless handheld devices, smart cards, magnetically encoded cards, or Universal Serial Bus (USB) hardware tokens, may be used in place of tokens 116 and 126.

Configuration data for bringing network devices into a fully defined, functional state may be stored in a centralized or distributed configuration database 135. For example, as will be described further below, a network technician familiar with the technical details about the target network environment for a network device and the intended deployment of the network device can construct a set of configuration data to meet the customer's needs and upload it to the configuration database 135.

The device configuration server 110 is coupled to the network 105 and is has access to the configuration database 135. The device configuration server 110 runs a server program (not shown) that responds to configuration requests from network devices and transmits the appropriate configuration data to the requesting network devices. One embodiment uses a management protocol to transmit the configuration data. The management protocol is a communications protocol that is compatible with the network 105, the device configuration server 110, and the firmware program running on the network devices that permits the network devices to transmit and/or receive configuration data, such as configuration files, to/from the device configuration server 110 over the network 105. The management protocol may include encryption for security thereby enabling remote initial configuration and/or remote management to be conducted securely. In one alternative embodiment, the network device establishes a secure management tunnel with the device configuration server 110 using an intermediate VPN gateway. Once the management tunnel is established, a standard management protocol such as SNMP is used to configure the device. In another alternative embodiment, the function of the device configuration server 110 and configuration database 135 are implemented by a Common Open Policy Service Usage for Policy Provisioning (COPS-PR) Policy Information Base and Policy Server, such as those described in Request for Comments (RFC) 2748, published January 2000 and RFC 3084, published March 2001. Importantly, in alternative embodiments, the network through which the VPN gateways 115 and 125 are coupled to the device configuration server and over which the configuration data is transmitted may be a different network than the one through which the VPN gateways 115 and 125 communicate.

Network Device Provisioning

Figure 2:
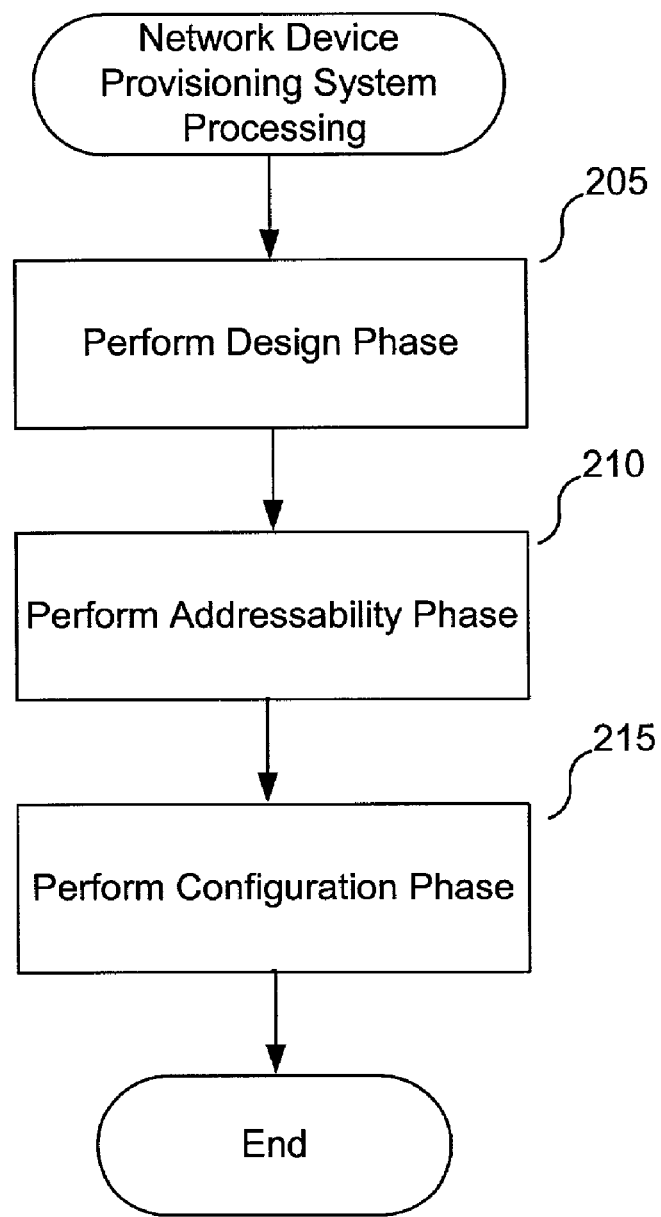
FIG. 2 is a high-level flow diagram illustrating various phases of a network device provisioning system according to one embodiment of the present invention.

FIG. 2 is a high-level flow diagram illustrating various phases of a network device provisioning system according to one embodiment of the present invention. In the following discussion it is assumed that a customer desires to use a networking service provided by a vendor and that the vendor ships network devices and storage devices pre-programmed with appropriate addressability data for the target network environment to the customer's sites and provides a remote device configuration server to support initial remote configuration. In alternative embodiments, however, various other scenarios are contemplated. For example, one or more of the supplier of the network devices, the supplier of the programmed storage devices, and the supplier of the remote configuration service may be different entities.

In the embodiment depicted, the network device provisioning system processing begins at block 205. At block 205, the design phase is performed. Typically, before any network equipment is shipped by the vendor, the customer places an order with the vendor. This is an ideal opportunity for the vendor to capture the relevant technical details about the customer's network environment and the customer's intended deployment of the network devices ordered. Therefore, according to one embodiment of the present invention, specific details, such as where the network devices will reside in the network and how they will process packets, are obtained from the customer prior to delivery of the network devices to the customer's network site. This specific information is then synthesized by a highly skilled network technician with the aid of the console computer 130 to produce addressability data and configuration data for use in the addressability phase and the configuration phase, respectively. Briefly, addressability data may be conceptually thought of as basic set of data that enables a network device to boot up in an initial operating configuration, such as a valid IP configuration, in which it can communicate and be addressable within the target network environment. Meanwhile, configuration data is a set of data that allows the network device to move beyond the initial operating configuration to a fully defined, functional state in which it is configured and ready to forward, filter, and/or route packets as desired by the customer. Specific examples of such data are discussed below.

At block 210, the addressability phase is performed. The addressability phase is typically performed after the network device has been delivered to the customer's network site and coupled with the target network environment. At this point it is useful to point out that the network device's factory default configuration contains no data to identify the network device to the target network environment in which it will be functioning. Additionally, in the factory default configuration, the network device does not know the identity of the other network devices in the target network environment. In general, what is needed for a network device to communicate and be addressable on the network is a unique logical address, such as an IP address and subnet mask for itself and the logical address of its default gateway. Supplying this and potentially other basic information is the purpose of the addressability phase, which involves the transfer of this information to the network device with the aid of a pre-programmed storage device, such as a smart hardware token. In alternative embodiments, various other storage devices may be employed such as such as wireless handheld devices, smart cards, or magnetically encoded cards.

To complete the configuration of the network device and put it into a fully defined, functional state, the remaining customer-specific data stored in the configuration database 135 ("configuration data") is supplied to the network device at block 215 by performing the configuration phase. After completion of the addressability phase, the network device is capable of communicating on the network and is addressable. Therefore, according to one embodiment, upon completion of the addressability phase, the network device makes a request to the device configuration server 110 to download the configuration data from the configuration database 135 over the transit network 105.

Furthermore, in one alternative embodiment, the design, addressability, and configuration phases can later be repeated in order to modify the network design and update the network devices, e.g., to add a fourth device to a previously provisioned, fully-meshed network of three devices. In this case the design, addressability, and configuration phases serve to provision the new device as described above. However, only the design and configuration phases are performed to modify the three previously configured devices; it is not necessary to re-establish their addressability.

Design Phase Processing

Figure 3:
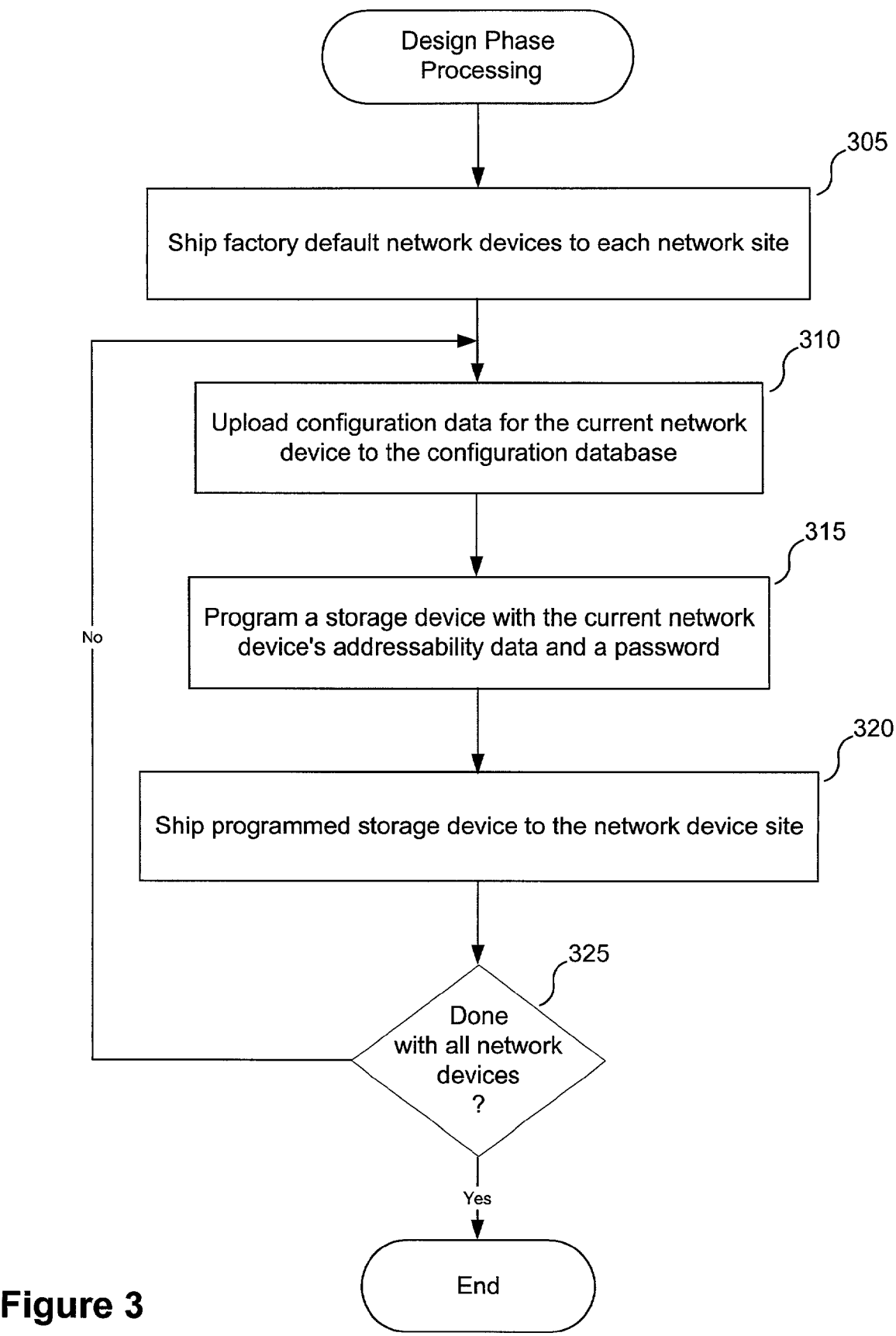
FIG. 3 is a flow diagram illustrating design phase processing according to one embodiment of the present invention.

FIG. 3 is a flow diagram illustrating design phase processing according to one embodiment of the present invention. The embodiment depicted assumes information upon which the configuration data is dependent has already been acquired from the customer. For example, as described above, an ideal time to obtain specific details regarding the customer's target network environment and intended usage of the network device(s) is during the order taking process or prior to shipping of the network device(s).

At any rate, design phase processing begins at block 305 where the network devices ordered by the customer are shipped to appropriate network sites in a factory default state.

Before moving on to block 310, a network technician analyzes the customer's requirements and determines parameters for allowing the network devices to boot in an initial operating state in the target network environment. For example, to make a network device operational on the Internet and allow it to perform automatic remote initial configuration processing the following set of parameters are typically specified:

The network device's local IP subnet mask and a unique IP address within that subnet. Following standard practice for communications networks these addresses are chosen so as to provide a unique public address for the network device on the target network. Alternatively, if an address mapping technique such as Network Address Translation (NAT) is to be used for the network device, some unique, public address is mapped to the network device.

The IP address of a default gateway (e.g., a router) that will route data from the network device to the remote device configuration server 110 via the transit network 105. The default gateway will also route return data from the device configuration server 110 to the network device.

The IP address of the device configuration server 110.

In alternative embodiments, where automatic provisioning is not employed, the IP address of the device configuration server 110 need not be included as part of the addressability data. It should also be appreciated that in different network environments using different network protocols, for example, other minimum sets of addressability data may be needed to make a network device operational.

To permit secure configuration, each network device also may be provided with security data for authentication. For example, each network device may be assigned a unique identifier or password that it can present to the device configuration server 110 to allow the device configuration server 110 to validate the network device and/or the smart hardware storage device being employed.

At block 310, the configuration data for the current network device is uploaded to the configuration database 135 and associated with security data, such as a unique identifier or password. For example, according to one embodiment, the network technician may use the console program executing on the console computer 130 to enter the parameters for the network devices ordered by the customer into the configuration database 135. One advantage of the console program is that it can substantially improve the reliability of this task for larger networks by generating and validating consistent configuration data for all network devices. This is otherwise a common source of errors.

At block 315, a smart hardware storage device associated with the current network device is programmed with the network device's addressability data and the corresponding security data used in block 310. According to one embodiment, the network technician accomplishes this by attaching the smart hardware storage device to the EIA232-compliant communications port and then copying the addressability data to a memory in the smart hardware storage device using a communication protocol associated with the smart hardware storage device.

At block 320, the programmed hardware storage device is separately shipped to the network device site.

At block 325, a determination is made whether the design phase activities have been completed for all the customer's network devices. If so, the design phase is complete; otherwise the design phase continues with block 310.

This example is intended to illustrate a security feature of the novel provisioning scheme described herein. Because the network device can remain in its sealed carton, the network device and the smart hardware storage device, e.g., a hardware token, may be shipped to the customer's network site separately. In this manner, the use of a pre-programmed hardware storage device minimizes the chance of a security breach in the event that the network device is stolen in transit as the thief would be unable to bring the network device online and pose as the rightful owner unless he also intercepted the separately shipped hardware storage device in transit and duplicated or spoofed the rightful owner's network addresses.

Exemplary Network Device

Figure 4:
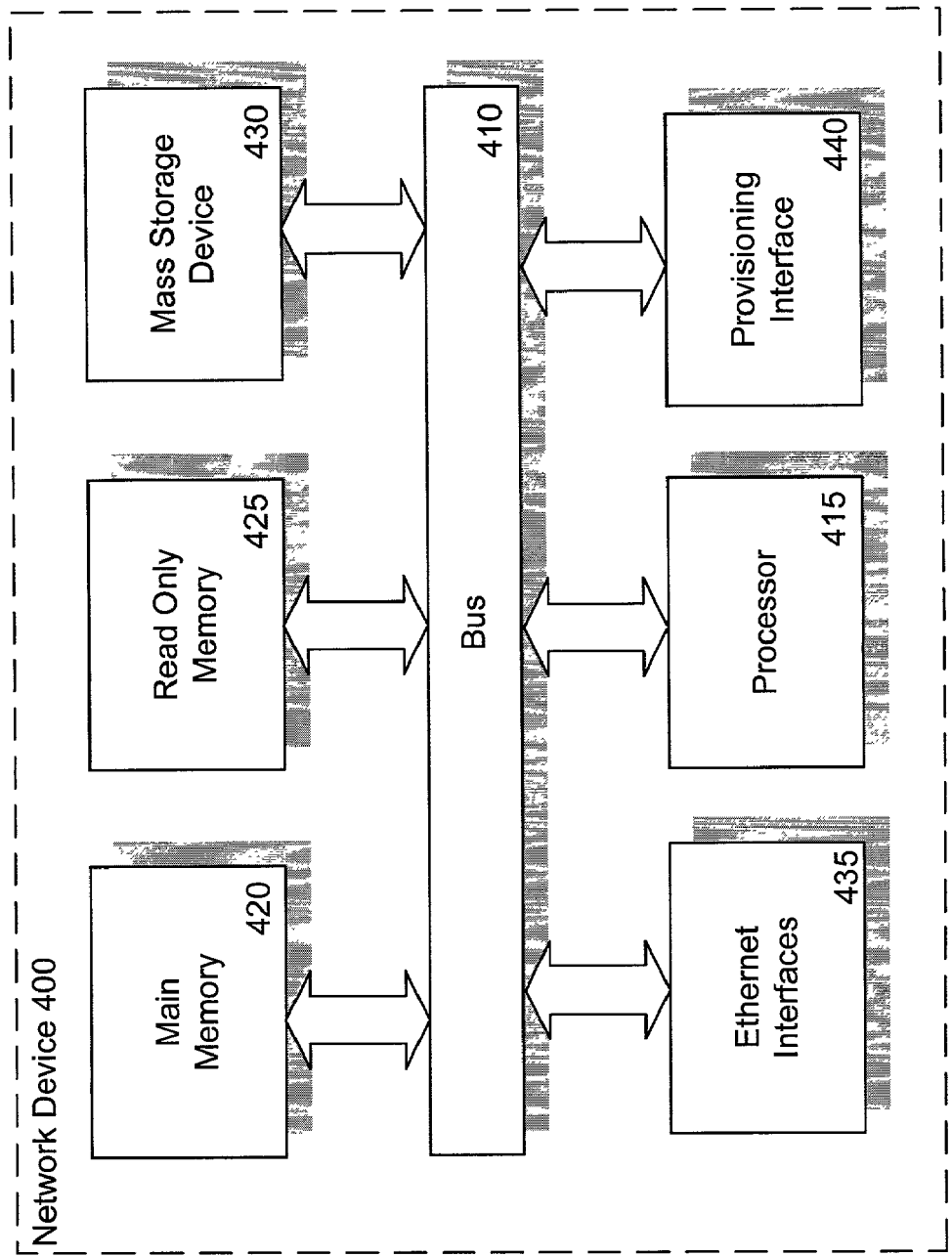
FIG. 4 is a high-level block diagram of a network device according to one embodiment of the present invention.

FIG. 4 is a simplified, high-level block diagram of a network device 400 according to one embodiment of the present invention. The network device 400 represents an exemplary network computing or network communication device, such as a VPN gateway, a router, a switch, or a firewall, in which features of the present invention may be implemented. According to various embodiments of the present invention, the network device may be a current or future version of the Intel® NetStructure™ 31xx line of VPN devices or a current or further version of other Intel network computing products, such as the Intel Express Router (Intel and NetStructure are trademarks or registered trademarks of Intel Corporation of Santa Clara, Calif.)

At any rate, in this example, the network device 400 comprises a communication means, such as a bus 410, for communicating information, and a processing means, such as one or more processors 415, coupled with bus 410 for processing information and executing instructions. Network device 400 further comprises a random access memory (RAM) 420 or other dynamic storage device (also referred to as main memory), coupled to bus 410 for storing information and instructions to be executed by processor 415. Main memory 420 also may be used for storing temporary variables or other intermediate information during execution of instructions by processor 415. Network device 400 also comprises a read only memory (ROM) 425 and/or other static storage device coupled to bus 410 for storing static information and instructions for processor 415.

A data storage device 430, such as a flash disk, magnetic disk or optical disc and a corresponding drive, may also be coupled to bus 410 for storing information and instructions. According to one embodiment, a firmware program, such as a bootstrap procedure, that controls the operation of the device may be stored in ROM 425 or on the data storage device 430 for access and execution by the processor 415.

Exemplary Smart Hardware Storage Device

Figure 5:
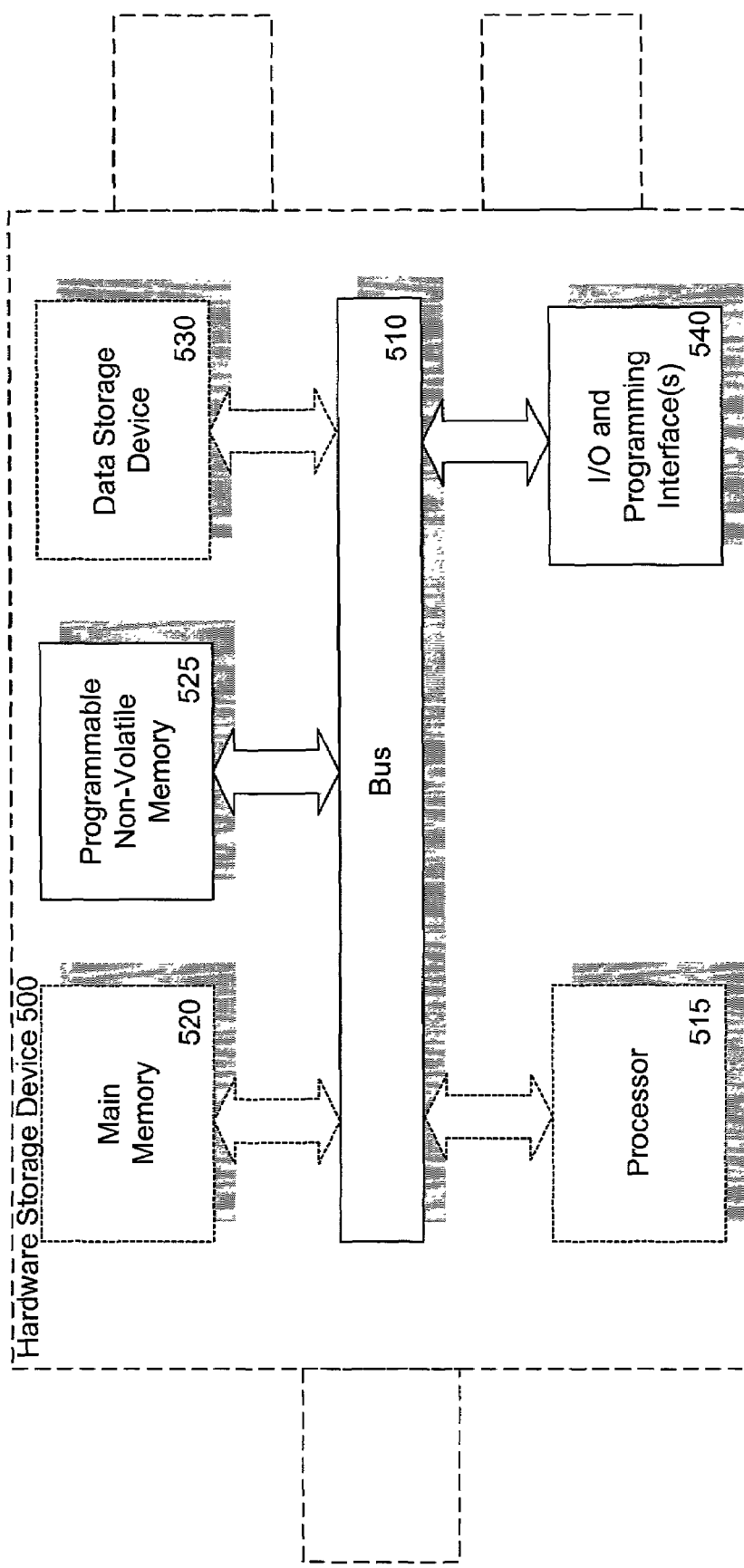
FIG. 5 is a block diagram of a smart hardware storage device according to one embodiment of the present invention.

FIG. 5 is a block diagram of a smart hardware storage device 500 according to one embodiment of the present invention. The smart hardware storage device 500 represents an exemplary programmable hardware token or other user-serviceable storage device that may be externally interfaced with a network device via a provisioning port of the network device, for example. According to one embodiment of the present invention, the smart hardware storage device comprises an enhanced or customized current or future version of the KEY-LOK™ line of dongles available from Microcomputer Applications, Inc. of Ridgway, CO or an enhanced or customized current or future version of the CRYPTO-BOX® line of hardware keys available from Marx® Software Security of Atlanta, Ga. (KEY-LOK is a trademark or registered trademark of Microcomputer Applications, Inc of Ridgway, CO; CRYPTO-BOX and MARX are trademarks or registered trademarks of Marx Software Security of Atlanta, Ga.).

According to various embodiments of the present invention, a lesser or more equipped hardware storage device may be desirable for certain implementations. Two exemplary configurations will be discussed herein—one with reference to the functional units depicted with solid lines and another with reference to the functional units depicted with solid lines and the functional units depicted with dotted lines. However, it is contemplated that the configuration of hardware storage device 500 will vary from implementation to implementation depending upon numerous factors, such as the desired balance among ease of use, security, and simplicity, and/or other constraints, such as price and performance.

According to one embodiment, the smart hardware storage device 500 comprises only a subset of the functional units depicted, i.e., those functional units depicted with solid lines. In this example, the smart hardware storage device 500 includes a communication means, such as a shared or dedicated bus 510, for communicating information, and a programmable, non-volatile memory 525 and/or other static storage device coupled to the bus 510 for storing static information, such as addressability data and security data for use by a network device during an addressability phase and a configuration phase, respectively. The smart hardware storage device 500 also includes one or more Input/Output (I/O) and programming interfaces 540 coupled to the bus 510 for receiving data to be programmed into the programmable, non-volatile memory 525 and outputting data contained in the programmable, non-volatile memory 525 under the direction of a native communication protocol. According to one embodiment, for ease of use, only a single I/O and programming interface is included for both (1) receiving data from the console computer, for example, to be programmed into the programmable, non-volatile memory 525 and (2) outputting data residing in the programmable, non-volatile memory 525 to a network device in a factory default configuration. However, in alternative embodiments, the I/O and programming interfaces 540 may include separate and independent programming and output interfaces to facilitate interoperability with different port types.

According to another embodiment, the smart hardware storage device 500 comprises, in addition to the functional units depicted with solid lines, those of the functional units depicted with dotted lines. In this example, the smart hardware storage device 500 also includes a processing means, such as a processor 515, coupled with bus 410 for processing information and executing instructions, such as those implementing native console command sets for a variety of network devices. Hardware storage device 500 further comprises a random access memory (RAM) 520 or other dynamic storage device (also referred to as main memory), coupled to bus 510 for storing information and instructions to be executed by processor 515. Main memory 520 also may be used for storing temporary variables or other intermediate information during execution of instructions by processor 515. A data storage device 530, such as a flash disk, magnetic disk or optical disc and a corresponding drive, may also be coupled to bus 510 for storing information and instructions.

According to this configuration, the smart hardware storage device 500 may operate network devices that do not support the special provisioning mode in their bootstrap firmware by controlling the network device using its native console command set. For example, according to one embodiment, the token may contain logic and data (specified during the design phase) that directs a particular network device to perform the equivalent of the addressability phase, connect to the device configuration server, and complete the configuration phase. According to another embodiment, the smart hardware storage device 500 may directly or indirectly participate in upgrading, reloading, or supplementing the existing bootstrap firmware of the network device. For example, the logic and data specified during the design phase may cause the smart hardware storage device 500 to issue native console commands to the network device that direct it to download firmware updates from the device configuration server or some other intermediate device. Then, the addressability and/or configuration phases may continue as described herein.

As an alternative to hardware tokens, other existing or future media may also be suitable for use with the provisioning system described herein. However, there are several advantages of employing one of the hardware tokens described in connection with the embodiments discussed herein. First, as a pluggable component, a hardware token provides ease of use for non-skilled personnel and largely eliminates the risk of operator error. It can also serve as a secure key distribution method provided possession of the token is managed properly. Second, the hardware token enhances but does not alter the operation of a compatible network device. The network device is a fully operational piece of equipment when it leaves the factory, even if the automated provisioning feature were not available or not requested/ordered by the customer. Thus, in the hands of a skilled network administrator, a brand new unit, just out of the carton, could be connected into the target network environment and manually configured to run with the same enabled functionality as one in which addressability is established automatically and automatically provisioned.

As a result, the flexible provisioning scheme described herein enables a powerful feature—automated provisioning—in a network device that is nonetheless otherwise fully operational without the feature. Thus, the product acquires versatility which the vendor can take advantage of. Specifically, in the VPN industry, a service provider might sell a VPN device without the automated provisioning feature to a customer who wishes to manage its own equipment, but with the feature to a customer who desires an xSP-managed solution.

The token facilitates this versatility because it is an externally connected, user-serviceable component that can be attached or removed at will. When present, it causes the network device to be automatically provisioned. When the token is absent, the network device boots normally, and relies upon existing or manual configuration. The same versatility and ease of use cannot be achieved by a scheme that depends on swapping the flash memory module to configure the network device with customer data, for example.

Addressability Phase

Figure 6:
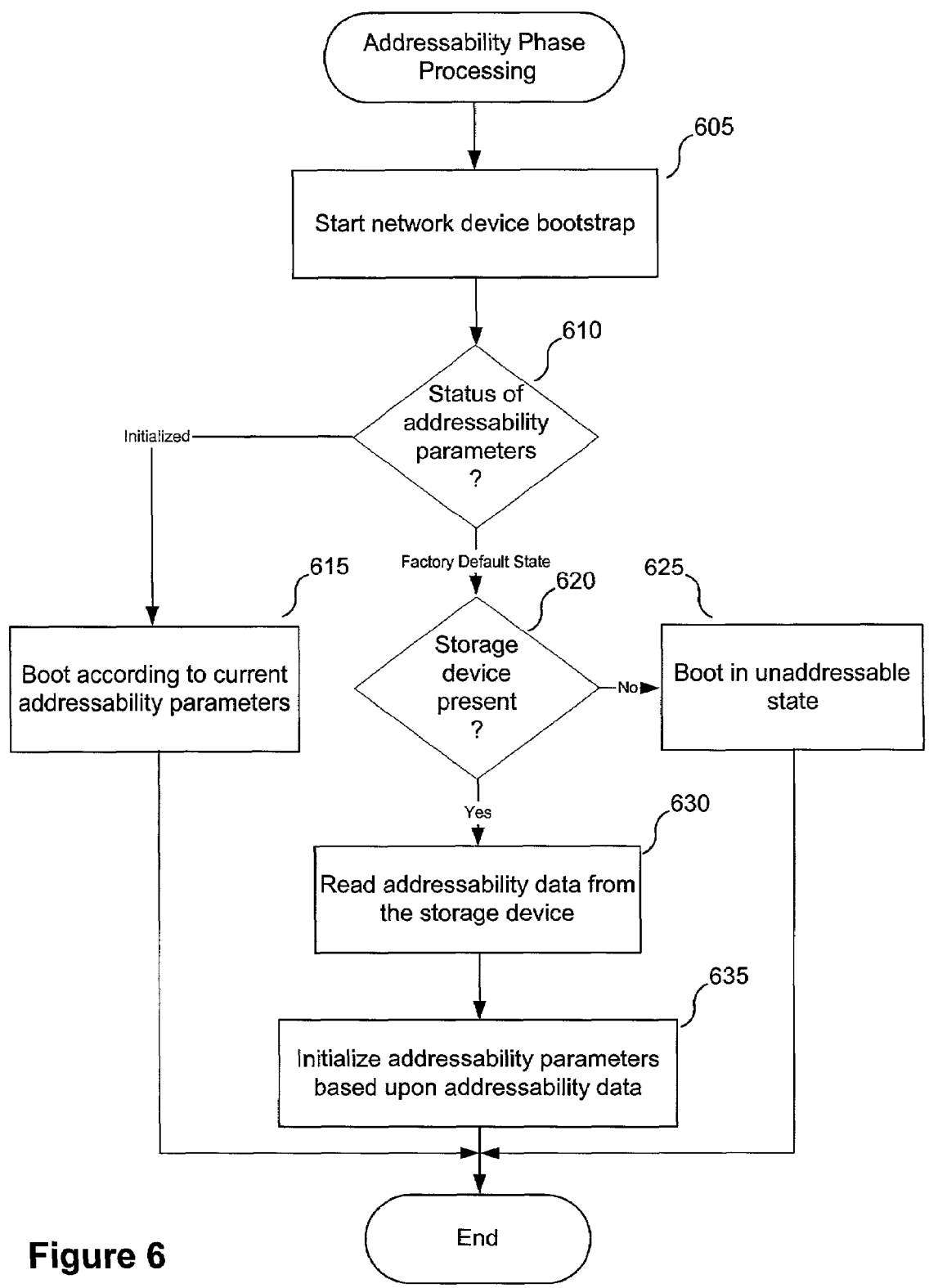
FIG. 6 is a flow diagram illustrating addressability phase processing according to one embodiment of the present invention.

FIG. 6 is a flow diagram illustrating addressability phase processing according to one embodiment of the present invention. In one embodiment, the actions described below may be performed under the control of a programmed processor, such as processor 415. However, in alternative embodiments, the actions may be fully or partially implemented by any programmable or hardcoded logic, such as Field-Programmable Gate Arrays (FPGAs), transistor-transistor logic (TTL), or Application Specific Integrated Circuits (ASICs), for example.

Briefly, according to embodiments of the present invention, installation of network devices can be accomplished by customer personnel who need not have any networking skills. When the pre-programmed smart hardware storage device arrives at each customer site, the customer personnel follow simple instructions to connect the power cable and network cables to the network devices and interface the smart hardware storage device with the corresponding network device (e.g., plug the hardware token into a designated provisioning port of the network device, such as an EIA232-compliant communications port, in the example implementation). When the network device is next reset or powered up, a boot time procedure detects the presence of the smart hardware storage device, enters a special provisioning mode, and reads the addressability data from it.

When the network device 400 is started or reset by turning the power on (cold boot), by pressing a reset button (warm boot), or by issuing a software command to restart (warm boot), for example, a bootstrap loader program is executed. Typically, after successfully performing a few basic hardware diagnostic tests, such as a suite of power-on self tests, the operating system (OS) is loaded from non-volatile storage into operating memory by processor 415 or another device, such as a direct memory access controller. Sequences of instructions comprised by the OS are then executed by processor 205 to load other programs into operating memory from non-volatile storage. However, according to one embodiment of the present invention, prior to passing control to the OS, the bootstrap process or another firmware program initiated by or before the bootstrap process (referred to generally as a "boot time process" or a "boot time procedure") determines whether to enter a special provisioning mode to receive addressability data. In the embodiment depicted, the special provisioning mode is represented by blocks 630 and 635 as part of the network device boot strap process.

The addressability phase processing begins at block 605. In the examples described herein, for convenience, the boot time process is assumed to be the bootstrap process. Upon cold or warm boot of the network device, the network device bootstrap process is initiated. At decision block 610, the status of the network device's addressability parameters is determined. If the addressability parameters are initialized, then the bootstrap process continues with block 615. Otherwise, if the addressability parameters are in the factory default state (e.g., uninitialized), then the bootstrap process continues with decision block 620.

At block 615, the network device boots according to the current addressability parameters with which the network device has previously been initialized and the bootstrap process is complete.

At decision block 620, having determined that the network device's addressability parameters are uninitialized, the bootstrap process detects whether the smart hardware storage device is present. According to one embodiment, presence detection involves sensing the physical connection of a hardware token to a designated provisioning port of the network device. In alternative embodiments, however, presence detection may involve detecting the physical proximity of a wireless handheld device, such as a personal digital assistant (PDA). According to other embodiments, presence of the smart hardware storage device is indicated by a magnetically encoded card having been swiped through a card reader of the network device or the presence of a smart card in a smart card interface of the network device. In any event, if the smart hardware storage device is present, then the bootstrap process enters the special provisioning mode and continues with block 630. Otherwise, the network device boots in an unaddressable state and the bootstrap process is complete.

At block 630, the addressability data is read from the smart hardware storage device using a communication protocol associated with the smart hardware storage device, if any. Additionally, if remote initial configuration is to be performed, at this point, a unique identifier or password may also be read from the smart hardware storage device. Finally, at block 635, the addressability parameters of the network device are initialized with the addressability data read from the smart hardware storage device. For example, the bootstrap process may store the addressability data in a non-volatile memory of the network device and set the network device's IP address, IP subnet mask, and default gateway address to those specified in the addressability data. According to one embodiment, the bootstrap process automatically or responsive to user input continues from block 635 to the network device configuration phase processing. However, in alternative embodiments, after block 635, the network device boots according to the newly initialized addressability parameters and the bootstrap process is complete.

Configuration Phase

Briefly, according to the described embodiment, once addressability has been established, a boot time process executing on the network device (e.g., a firmware program initiated during the bootstrap process of the network device) sends a request to the device configuration server at the address obtained from the programmed smart hardware storage device. The configuration phase involves processing by and communications between the boot time process executing on the network device and the remote device configuration server. For convenience, the different processing threads will be described separately from the perspective of the network device and the perspective of the remote device configuration server with reference to FIGS. 7 and 8, respectively.

Figure 7:
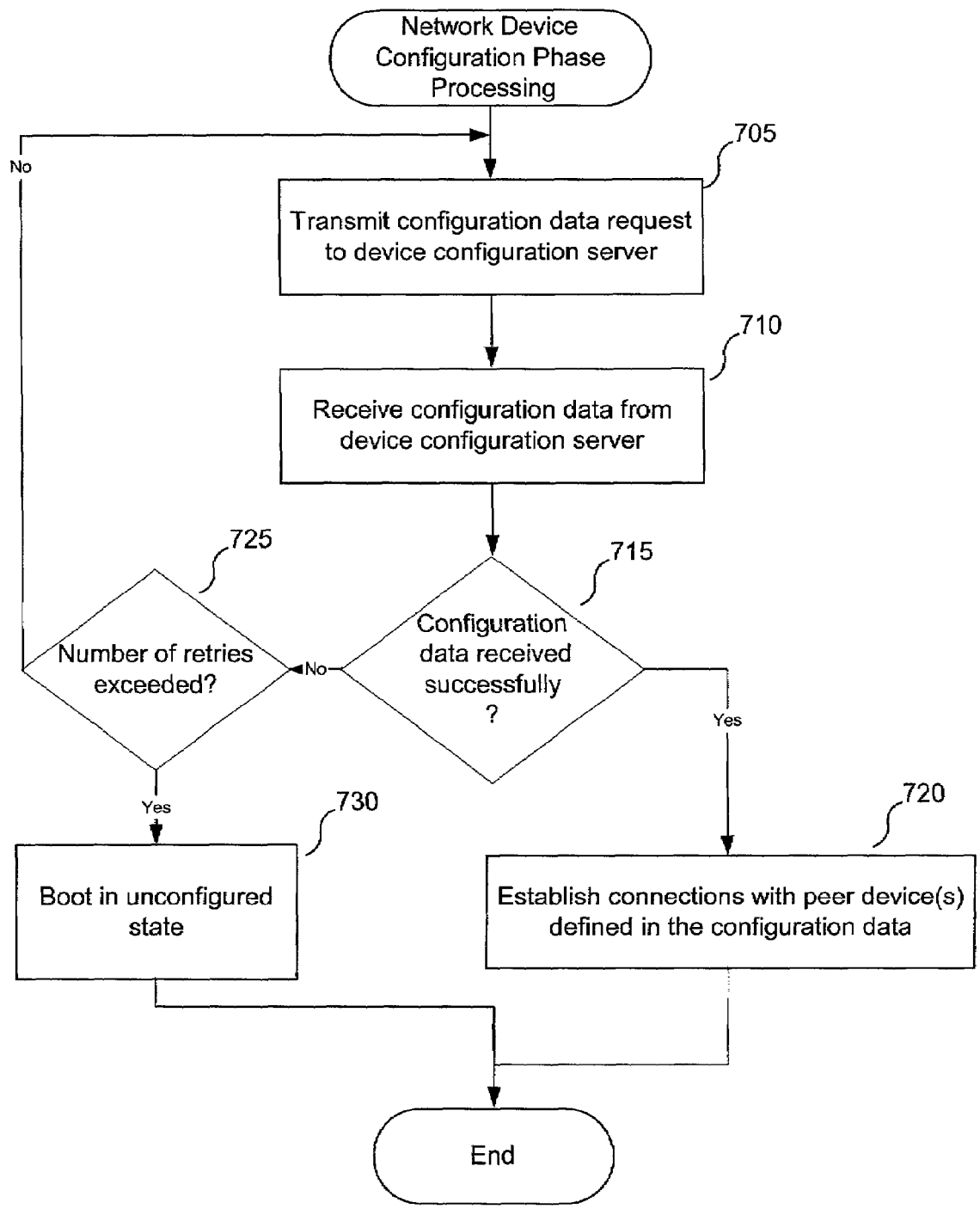
FIG. 7 is a flow diagram illustrating network device configuration phase processing according to one embodiment of the present invention.

FIG. 7 is a flow diagram illustrating network device configuration phase processing according to one embodiment of the present invention. As mentioned above, according to one embodiment, the configuration process may be automatically or manually initiated after completion of block 635. In this embodiment, blocks 705 through 730 would be part of the special provisioning mode. In any event, at this point, the network device is able to use the addressability data to communicate with surrounding network equipment (such as routers). Thus, it can send and receive data over the network and proceed to the configuration phase.

The network device configuration phase processing begins at block 705 in which a configuration data request is transmitted to the device configuration server 110 (the logical address of which is presumed to have been previously supplied, for example, during the addressability phase). According to one embodiment, in which authentication is performed by the device configuration server 110, the configuration data request includes the security data from the smart hardware storage device, a portion of the security data, or data generated based upon the security data. Alternatively, the security data may be used directly or indirectly to encrypt communications exchanged between the network device and device configuration server 110, such as the configuration data request and the device configuration server's reply.

Assuming the network device and the smart hardware storage device are authenticated successfully by the device configuration server 110, at block 710, the requested configuration data is received from the device configuration server 110 by way of a management protocol, for example.

At decision block 715, a determination is made whether the configuration data was successfully received by the network device. If so, processing proceeds to block 720. Otherwise, processing branches to processing block 725. At block 720, the configuration data received from the device configuration server may be employed as part of an automated configuration process. In one embodiment, the configuration data represents the remaining data that the network device needs in order to become fully functional within the target network environment. After receiving the remaining data, connections may be established with one or more peer devices identified by the configuration data. According to one embodiment, the network device is a VPN gateway and the configuration data includes (1) one or more IP addresses of peer VPN devices with which the VPN gateway will be tunneling; and (2) port and protocol numbers for the traffic types to be allowed through the tunnel(s).

Advantageously, in this manner, non-skilled personnel can cause multiple network devices to be configured for the network in parallel.

At decision block 725, upon unsuccessful receipt of the configuration data from the device configuration server, a determination is made whether the number of retries have been exceeded. If so, at processing block 730, the network device boots in an unconfigured state. Otherwise, a retry is initiated by continuing with processing block 705.

According to one embodiment, once the device configuration server has successfully transmitted all configuration data and the network device has successfully received the configuration data, the network device is fully configured to operate according to the customer's requirements. Consequently, the network device may disable the special provisioning mode to avoid repeating the provisioning if the network device is rebooted with the token still attached.

Alternatively, the automated provisioning process may be repeated to replace current configuration data with updated configuration data. In this manner, the provisioning system is able to update the network devices with new configurations at a later time. Having provided the initial addressability and security data for each network device, the provisioning system is positioned to securely perform ongoing remote management.

Figure 8:
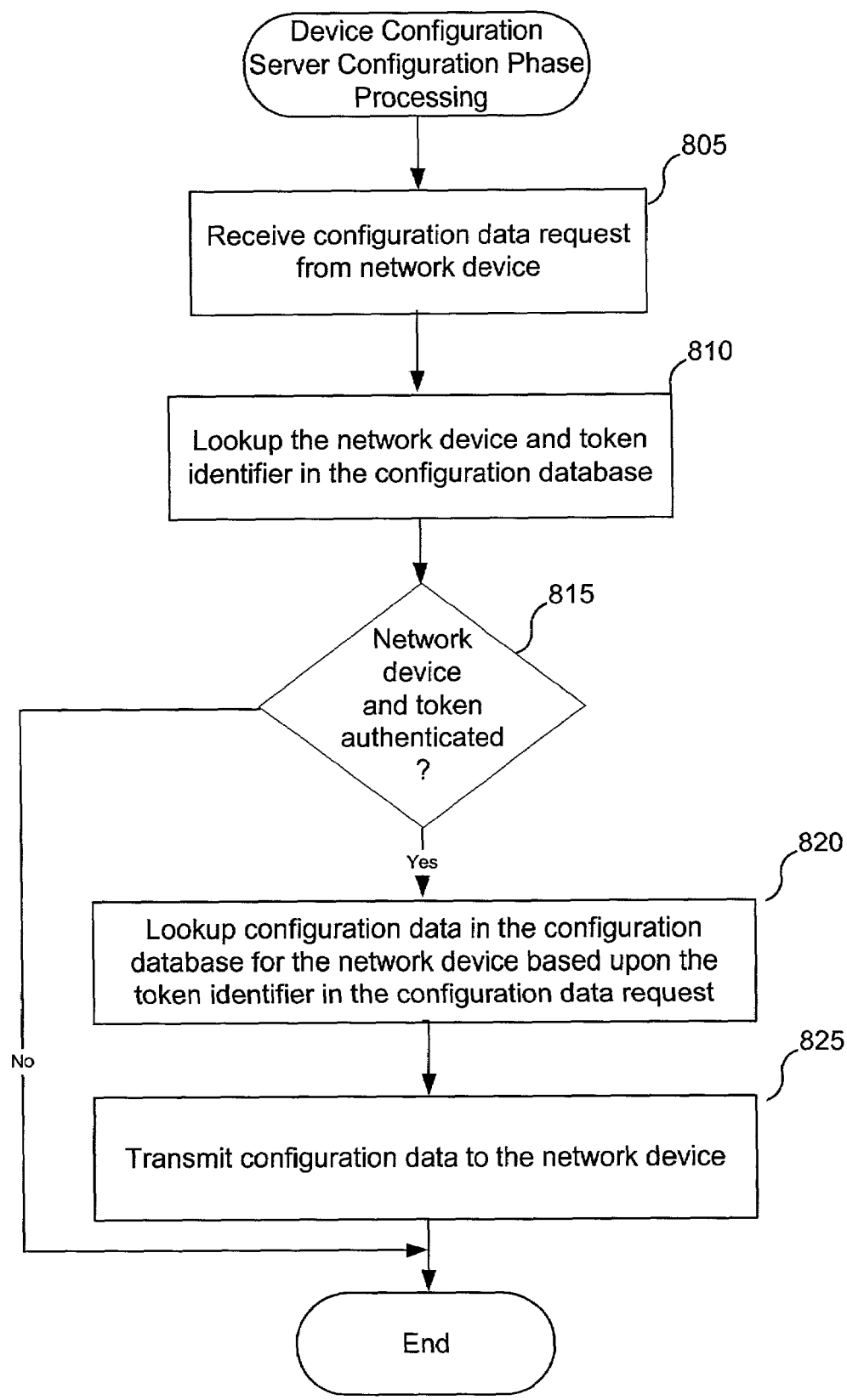
FIG. 8 is a flow diagram illustrating device configuration server configuration phase processing according to one embodiment of the present invention.

FIG. 8 is a flow diagram illustrating device configuration server configuration phase processing according to one embodiment of the present invention. After the device configuration server receives the configuration data request from the network device at processing block 805, the device configuration server performs an authentication/validation process in blocks 810 and 815 to determine whether the network device from which the request was transmitted is one that is recognized as having been registered for the automated provisioning service. Additionally, the token is authenticated based upon the security data, such as the password or the unique identifier, provided in the request for configuration data. Specifically, at processing block 810, the device configuration server looks up the network device and the token identifier in the configuration database and compares them against an authorized list. Then, at decision block 815, a determination is made whether the network device and token pass the authentication process. If so, access to the configuration database is granted for purposes of supplying the configuration data to the network device and processing continues with block 820. Otherwise, if either the network device or the token are not authenticated, then access to the configuration database is denied and the configuration phase terminates without the device configuration server providing configuration data to the requesting network device. According to one embodiment, the network device and/or token authentication scheme may employ one of various available authentication protocols, such as Password Authentication Protocol (PAP) or Challenge Handshake Authentication Protocol (CHAP).

At processing block 820, the device configuration server looks up the appropriate set of configuration data in the configuration database for the network device based upon the security data provided in the request. Assuming the configuration data is found in the configuration database, it is transmitted to the requesting network device over the transit network 105 at block 825. According to one embodiment, the transmitted data is encrypted by the device configuration server and decrypted by the network device firmware using a shared secret stored in both the configuration database and in the smart hardware storage device.

While embodiments described herein have focused on a network transfer of configuration data from a remote source (e.g., a device configuration server) to the network device, in alternative embodiments all data, e.g., addressability and configuration data may be stored in the smart hardware storage device and delivered to the network device directly by the smart hardware storage device. However, the data transfer approach described herein is more flexible because depending on the complexity of the customer's requirements, the configuration data may occupy a significant amount of storage space—anywhere from several Kbytes to tens or even hundreds of Kbytes. With a network data transfer, the delivery medium has no size limitation.

Additionally, the network data transfer delivery mechanism permits the device configuration server to provide ongoing remote management for large networks of heterogeneous devices. Provided each device supports the data transfer protocol, the device configuration server can deliver the appropriate configuration data to each type of device. Furthermore, the network data transfer delivery mechanism has speed and scalability advantages as the device configuration server can use the protocol to apply configuration changes to many network devices in a large network simultaneously.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method comprising:

detecting, by a boot time process of a network device in a factory default configuration, the presence of a removable external storage device on a local internal communications bus connector containing therein addressability data that allows the network device to communicate and be addressable within a network environment in which it will be functioning, the addressability data including an IP address of a remote device configuration server;

after detecting the presence of the storage device, receiving at the network device the addressability data by using a protocol associated with the storage device to transport the addressability data from the storage device to the network device;

establishing addressability of the network device, by the boot time process, to enable it to communicate with and be addressed by other nodes in the network environment by configuring one or more address parameters of the network device based upon the addressability data; and receiving configuration data from the remote device configuration server, the configuration data including an IP address of a peer VPN device with which the network device may establish a tunnel.

2. The method of claim 1, wherein the network device includes a designated provisioning port, and said detecting the presence of a storage device includes detecting the presence of the storage device coupled to the designated provisioning port.

3. The method of claim 2, wherein the designated provisioning port comprises an asynchronous EIA232-compliant communications port.

4. The method of claim 2, wherein the storage device comprises a hardware token that includes non-volatile, programmable memory.

5. The method of claim 1, wherein the addressability data comprises:
- a unique Internet Protocol (IP) address for the network device;
- a local IP subnet mask for the network device;
- an IP address associated with a default gateway for the network device; and
- an IP address of a remote device configuration server.

6. The method of claim 1, further comprising the boot time process:
- encrypting a configuration request using security data retrieved from the storage device; and
- transmitting the encrypted configuration request to the remote device configuration server.

7. The method of claim 1, wherein the storage device also contains sufficient configuration data to bring the network device into a fully defined, functional state, and wherein the method further comprises receiving at the network device the configuration data by using the protocol to transport the configuration data from the storage device to the network device.

8. The method of claim 1, further comprising prior to said detecting the presence of a storage device, the storage device or another storage device loading or controlling the loading of firmware into the network device, the firmware including instructions representing the boot time process.

9. The method of claim 1, further comprising transmitting a configuration request to the remote device configuration server from the boot time process, the configuration request including security data retrieved from the storage device or being encrypted based upon the security data.

10. The method of claim 9, wherein the network device comprises a virtual private network (VPN) device, and the method further comprises receiving, in response to the configuration request, configuration data from the remote device configuration server, the configuration data including at least one IP address of a peer VPN device with which the network device will establish a tunnel, and port and protocol numbers for traffic types to be allowed through the tunnel.

11. The method of claim 1, wherein the network device comprises a virtual private network (VPN) gateway.

12. The method of claim 1, wherein the network device comprises a router.

13. The method of claim 1, further comprising prior to said receiving the addressability data and in response to said detecting the presence of a storage device the network device entering into a provisioning mode to handle receipt of the addressability data and said establishing addressability of the network device.

14. The method of claim 1, wherein the storage device comprises a wireless handheld device.

15. The method of claim 1, wherein the storage device comprises a Universal Serial Bus (USB) hardware token.

16. The method of claim 1, wherein the storage device comprises a smart card.

17. The method of claim 1, wherein the storage device comprises a magnetically encoded card.

18. A method comprising the steps of:
- a step for establishing addressability of a network device that takes the network device during a boot time process from a factory default state to an initial operating state in which the network device can communicate and is addressable within a predetermined network environment using an external removable static storage device on a local internal communications bus connector containing addressability data that includes an IP address of a remote device configuration server; and
- a step, responsive to completion of the step for establishing addressability during the boot time process, for provisioning the network device that takes the network device from the initial operating state to a fully defined, functional state in which the network device is configured and ready to process network traffic in the predetermined network environment by acquiring remaining configuration data by way of one or more data transfers over a network from the remote device configuration server by receiving configuration data from the remote device configuration server, the configuration data including an IP address of a peer VPN device with which the network device may establish a tunnel.

19. The method of claim 18, wherein said step for establishing addressability of the network device using an external storage device involves using a hardware token coupled to an asynchronous EIA232-compliant communications port of the network device, the hardware token including a non-volatile, programmable memory having stored therein addressability data including a unique Internet Protocol (IP) address for the network device, an IP address associated with a default gateway for the network device, an IP subnet mask, and an IP address of the remote device configuration server.

20. The method of claim 18, wherein said step for establishing addressability of the network device using an external storage device comprises using a hardware token coupled to a port of the network device controlling the network device using a native console command set of the network device.

21. A method comprising:
- detecting, by a boot time process of a first virtual private network (VPN) device in a factory default configuration, the presence of a removable external hardware token coupled to a designated provisioning port on a local internal communications bus of the first VPN network device, the hardware token including a non-volatile, programmable memory having stored therein addressability data that allows the first VPN device to communicate and be addressable within a predetermined network environment;
- after detecting the presence of the hardware token, receiving at the first VPN device the addressability data by using a protocol associated with the hardware token to read the addressability data from the non-volatile, programmable memory of the hardware token;
- establishing addressability of the first VPN device, by the boot time process, to enable it to communicate with other network devices in the predetermined network environment by setting one or more address parameters of the first VPN device based upon the addressability data;
- transmitting a configuration request to a remote device configuration server from the boot time process, the configuration request including security data read from the hardware token or encrypted based upon the security data;
- receiving, in response to the configuration request, tunnel configuration data from the remote device configuration server, the tunnel configuration data including an Internet Protocol (IP) address of a second VPN device associated with the predetermined network environment; and causing a tunnel to be established between the first VPN device and the second VPN device through a transit network based upon the tunnel configuration data.

22. The method of claim 21, wherein the transit network comprises a private internetwork.

23. The method of claim 21, wherein the transit network comprises a public internetwork.

24. The method of claim 23, wherein the transit network comprises the Internet.

25. A network device provisioning system comprising:
a first network device to be placed in an initial operating configuration in which the first network device can communicate and be addressable within a predetermined network environment;
a removable external hardware token to interface with a designated provisioning port on a local internal communications bus of the first network device, the hardware token including a non-volatile, programmable memory having stored therein addressability data for the first network device, the addressability data including an IP address of a remote device configuration server;
wherein the first network device is to automatically initiate an addressability phase during a boot time process in response to detecting the presence of the hardware token on the designated provisioning port, during the addressability phase, the addressability phase including receiving the addressability data from the hardware token and transitioning from a current configuration to the initial operating configuration during the boot time process, and
wherein the first network device is further to automatically initiate a configuration phase, the configuration phase including receiving configuration data from the remote device configuration server, the configuration data including an IP address of a peer VPN device with which the network device may establish a tunnel.

26. The network device provisioning system of claim 25, further comprising:
a remote device configuration server to manage access to a plurality of sets of configuration data including a first set of configuration data for the first network device;
wherein the non-volatile, programmable memory of the hardware token additionally has stored therein a unique identifier corresponding to the first set of configuration data, and
wherein the first network device is to automatically initiate the configuration phase in response to completion of the addressability phase, during the configuration phase, the first network device transmits a configuration request that includes the unique identifier to the remote device configuration server and the remote device configuration server responds to the configuration request by supplying the first set of configuration data to the first network device.

27. The network device provisioning system of claim 26, wherein the first network device comprises a first virtual private network (VPN) device, and wherein the first set of configuration data includes an IP address of a second VPN device with which the first network device will establish a tunnel, and port and protocol numbers for traffic types to be allowed through the tunnel.

28. The network device provisioning system of claim 26, wherein the first network device comprises a router, and wherein the first set of configuration data includes access control list (ACL) information.

29. A network device comprising:
a provisioning interface to receive addressability data from a removable external storage device on a local internal communications bus, the addressability data allowing the network device to communicate and be addressable within a target network environment, the addressability data including an IP address of a remote device configuration server;
one or more flash memory modules having stored therein firmware to:
check for the presence of the storage device during boot time processing,
cause the addressability data to be received from the storage device using a protocol associated with the storage device if the storage device is present,
establish addressability of the network device by configuring one or more address parameters of the network device based upon the addressability data;
receive configuration data from the remote device configuration server, the configuration data including an IP address of a peer VPN device with which the network device may establish a tunnel; and
a processor coupled to the one or more flash memory modules to execute the firmware in response to reset or power up.

30. The network device of claim 29, wherein the provisioning interface comprises an asynchronous EIA232-compliant communications port.

31. The network device of claim 29, wherein the firmware further transmits a configuration request to the a remote device configuration server, the configuration request including security data retrieved from the storage device or being encrypted based upon the security data.

32. The network device of claim 31, wherein the network device comprises a virtual private network (VPN) device, and the firmware further receives, in response to the configuration request, configuration data from the remote device configuration server, the configuration data including at least one IP address of a peer VPN device with which the network device will establish a tunnel, and port and protocol numbers for traffic types to be allowed through the tunnel.

33. The network device of claim 31, wherein the network device comprises a router, and the firmware further receives, in response to the configuration request, configuration data from the remote device configuration server, the configuration data including access control list (ACL) information.

34. A machine-readable medium having stored thereon data representing instructions that, if executed by a processor of a network device, cause the processor to:
detect, during a boot time process, the presence of a removable external static storage device on a local internal communications bus connector, the storage device containing therein addressability data that allows the network device to communicate and be addressable within a network environment in which it will be functioning, the addressability data including an IP address of a remote device configuration server;
receive the addressability data by using a protocol associated with the Storage device to transport the addressability data from the storage device to the network device;
establish addressability of the network device during the boot time process to enable it to communicate with and be addressed by other nodes in the network environment by configuring one or more address parameters of the network device based upon the addressability data; and receive configuration data from the remote device configuration server, the configuration data including an IP address of a peer VPN device with which the network device may establish a tunnel.

35. The machine-readable medium of claim 34, wherein the addressability data further comprises:
   a unique Internet Protocol (IP) address fur the network device;
   a local IP subnet mask for the network device; and
   an IP address associated with a default gateway for the network device.

36. The machine-readable medium of claim 34, wherein the instructions further include instructions which, if executed by the processor, cause the processor to transmit a configuration request to the remote device configuration server, the configuration request including security data based upon information retrieved from the storage device.

37. The machine-readable medium of claim 34, wherein the network device comprises a virtual private network (VPN) device, and wherein the instructions further include instructions which, if executed by the processor, cause the processor to receive, in response to the configuration request, configuration data from the remote device configuration server, the configuration data including at least one IP address of a peer VPN device with which the network device will establish a tunnel, and port and protocol numbers for traffic types to be allowed through the tunnel.

38. A method of deploying a network device comprising:
   providing a network device;
   providing a removable external hardware token to interface with a designated provisioning port on a local internal communication bus of the network device;
   programming a non-volatile memory of the hardware token with addressability data for the network device, which is capable of automatically initiating an addressability phase during a boot time process in response to detecting the presence of the hardware token on the designated provisioning port, the addressability phase causing the network device to receive the addressability data from the hardware token and transition from a current configuration to an initial operating configuration in which the network device can communicate and be addressable within a predetermined network environment;
   programming the non-volatile memory of the hardware token with an IP address of a remote device configuration server for a configuration phase, the configuration phase causing the network device to receive configuration data from the remote configuration server, the configuration data including an IP address of a peer VPN device with which the network device may establish a tunnel; and separately shipping the network device and the programmed storage device to a network site at which the network device will be installed within the predetermined network environment.

39. The method of claim 38, wherein the network device is capable of automatically initiating the a configuration phase in response to the completion of the addressability phase, during which the network device transmits a configuration request to a remote configuration server responsible for managing access to a remote configuration database, the method further comprising:
   uploading configuration data for the network device into the remote configuration database and associating the configuration data with a unique set of security data
   programming the non-volatile memory of the hardware token with the unique set of security data to be provided to the network device for inclusion withthe configuration request.

40. The method of claim 38, wherein the addressability data comprises:
   a unique Internet Protocol (IP) address for the network device;
   a local IP subnet mask for the network device;
   an IP address associated with a default gateway for the network device; and
   an IP address of a remote device configuration server.

41. The method of claim 39, wherein the network device comprises a virtual private network (VPN) device, and the configuration data comprises at least one IP address of a peer VPN device with which the network device will establish a tunnel, and port and protocol numbers for traffic types to be allowed through the tunnel.

42. The method of claim 41, wherein in response to receiving the configuration data, the network device causes a tunnel to be established with the peer VPN device through a transit network.

43. The method of claim 38, wherein the network device comprises a router.

44. The method of claim 38, wherein the designated provisioning port comprises an asynchronous EIA232-compliant communications port.

45. A method of installing a network device comprising:
   receiving delivery of a network device that is capable of automatically initiating an addressability phase during a boot time process in response to detecting the presence of a removable external hardware token on a designated provisioning port of a local internal communications bus of the network device and capable of automatically initiating a configuration phase in response to completion of the addressability phase;
   receiving delivery of the hardware token, the hardware token to interface with the designated provisioning port of the network device, the hardware token including a non-volatile, programmable memory having stored therein addressability data to place the network device in an initial operating State in which the network device can communicate and be addressable within a predetermined network environment, the addressability data including an IP address of a remote device configuration server;
   communicatively coupling the network device with the predetermined network environment;
   initiating the add ressability phase by coupling the hardware token to the designated provisioning port of the network device and causing the network device to boot, the addressability phase causing the network device to receive the addressability data from the hardware token and transition from a current configuration to the initial operating configuration during the boot time process; and
   initiating the configuration phase by receiving configuration data from the remote device configuration server, the configuration data including an IP address of a peer VPN device with which the network device may establish a tunnel.

46. The method of claim 45, wherein the non-volatile, programmable memory of the hardware token additionally has stored therein a unique identifier associated with a set of configuration data for the network device and stored in a remote configuration database, and wherein during the configuration phase, the network device causes the set of configuration data to be delivered to the network device by transmitting a configuration request including the unique identifier to a remote configuration server that is responsible for managing access to the remote configuration database.

47. The method of claim 45, wherein the addressability data further comprises:
   a unique Internet Protocol (IP) address for the network device;
   a local IP subnet mask for the network device; and
   an IP address associated witha default gateway for the network device.

48. The method of claim 46, wherein the network device comprises a virtual private network (VPN) device, and the set of configuration data comprises at least one IP address of a peer VPN device with which the network device will establish a tunnel, and port and protocol numbers for traffic types to be allowed through the tunnel.

49. The method of claim 48, wherein in response to receiving the configuration data, the network device causes a tunnel to be established with the peer VPN device through a transit network.

50. The method of claim 45, wherein the network device comprises a router.

51. The method of claim 45, wherein the designated provisioning port comprises an asynchronous EIA232-compliant communications port.

52. A method of delivering a network device comprising:
   shipping a fully operational network device in a factory default configuration to a customer network site at which the network device will be installed within a predetermined network environment, the network device capable of automatically
   initiating an addressability phase in response to detecting the presence of a removable external smart hardware storage device on a designated provisioning port of a local internal communications bus of the network device, and capable of initiating a configuration phase in response to completion of the addressability phase; and
   if the customer has requested an automated provisioning feature, then
   programming a removable external smart hardware storage device with addressability data for the network device, the smart hardware storage device to interface with the designated provisioning port of the network device and cause the addressability phase to be initiated during a boot time process, the addressability phase causing the addressability data to be transferred from the smart hardware storage device to the network device and enabling
   the network device to transition from the factory default configuration to an initial operating configuration during a boot time process in which the network device can communicate and be addressable within the predetermined network environment, the addressability data including an IP address of a remote device Configuration server from which the network device may receive configuration including an IP address of a peer VPN device with which the network device may establish a tunnel, and
   shipping the programmed smart hardware storage device to the customer network site.

53. The method of claim 52, wherein during the configuration phase the network device transmits a configuration request to a remote configuration server responsible for managing access to a remote configuration database, the method further comprising:
   uploading configuration data for the network device into the remote configuration database and associating the configuration data with a unique set of security data; and
   programming the smart hardware storage device with the unique set of security data to be provided to the network device for inclusion with the configuration request.

54. The method of claim 52, wherein the addressability data comprises:
   a unique Internet Protocol (IP) address for the network device;
   a local IP subnet mask for the network device; and
   an IP address associated with a default gateway for the network device.

55. The method of claim 53, wherein the network device comprises a virtual private network (VPN) device, and the configuration data comprises at least one IP address of a peer VPN device with which the network device will establish a tunnel, and port and protocol numbers for traffic types to be allowed through the tunnel.

56. The method of claim 55, wherein in response to receiving the configuration data, the network device causes a tunnel to be established with the peer VPN device trough a transit network.

57. The method of claim 52, wherein the network device comprises a router.

58. The method of claim 52, wherein the designated provisioning port comprises an asynchronous EIA232-compliant communications port.

59. The method of claim 52, wherein the network device and the programmed smart hardware storage device are shipped separately to the customer network site.

60. The method of claim 52, wherein the programmed smart hardware storage device interfaces with the designated provisioning port of the network device via one or more intermediate devices.

* * * * *